United States Patent [19]
Wolbert

[11] 3,935,627
[45] Feb. 3, 1976

[54] METHOD OF MAKING SHEET METAL PULLEY

[75] Inventor: Fred A. Wolbert, Northfield, Ohio

[73] Assignee: Arrowhead Engineering Corporation, Knox, Ind.

[22] Filed: July 19, 1974

[21] Appl. No.: 489,992

Related U.S. Application Data

[62] Division of Ser. No. 224,778, Feb. 9, 1972, Pat. No. 3,837,200.

[52] U.S. Cl. ............ 29/159 R; 29/421 R; 74/230.8
[51] Int. Cl.² .......................................... B21K 1/42
[58] Field of Search ........... 29/159 R, 421 R; 72/57, 72/58, 60, 61; 74/230.8

[56] References Cited
UNITED STATES PATENTS

| | | | |
|---|---|---|---|
| 349,718 | 9/1886 | Hollerith et al. | 72/59 |
| 701,549 | 6/1902 | Deering | 29/159 R |
| 2,743,691 | 5/1956 | Cuq | 29/421 X |
| 2,929,345 | 3/1960 | Zatyko, Sr. | 72/58 X |
| 3,335,590 | 8/1967 | Early | 72/58 |
| 3,394,569 | 7/1968 | Smith | 72/56 |
| 3,675,453 | 7/1972 | Marsch | 29/159 R X |
| 3,820,369 | 6/1974 | Tominaga et al. | 29/159 R X |

Primary Examiner—Victor A. DiPalma
Attorney, Agent, or Firm—Bacon & Thomas

[57] ABSTRACT

A method for forming the grooves in single and multi-groove sheet metal pulleys, including shaping and/or crimping of the groove walls, wherein the grooves are formed by a sequential, single step, continuous process from a punched or drawn blank without intermediate handling and/or displacement of the blank using both axial and radial pressures, wherein the applied radial pressures or forces are substantially less than the applied axial pressures or forces. The pulley may have grooves of the same or different pitch and of the same or different diameter.

16 Claims, 20 Drawing Figures

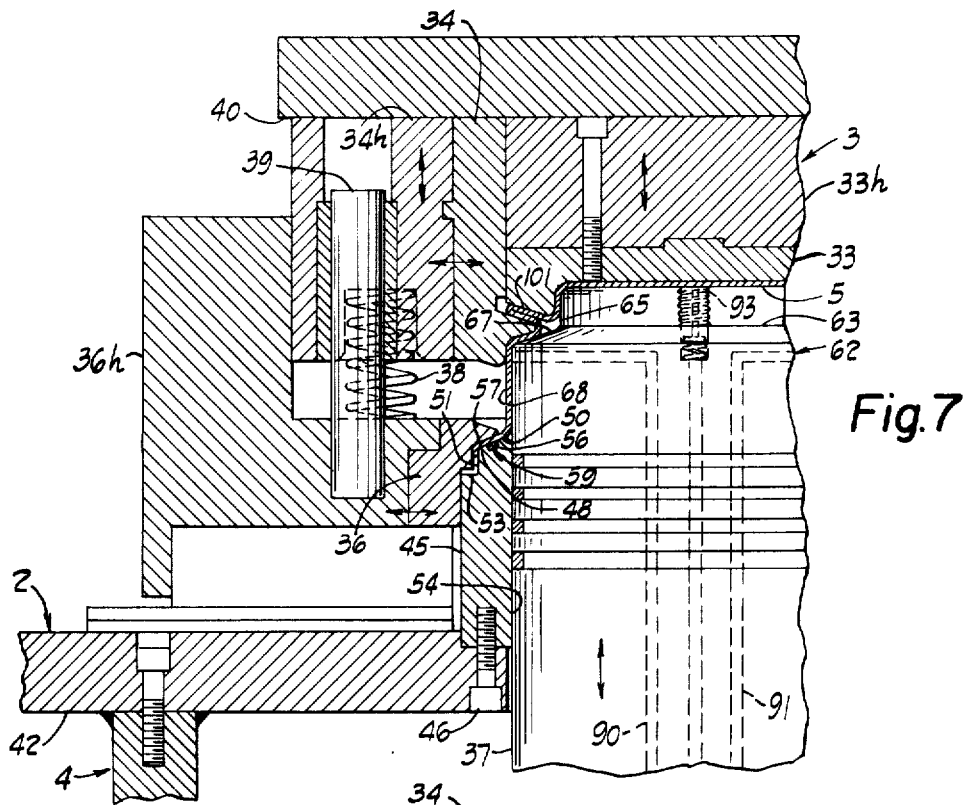
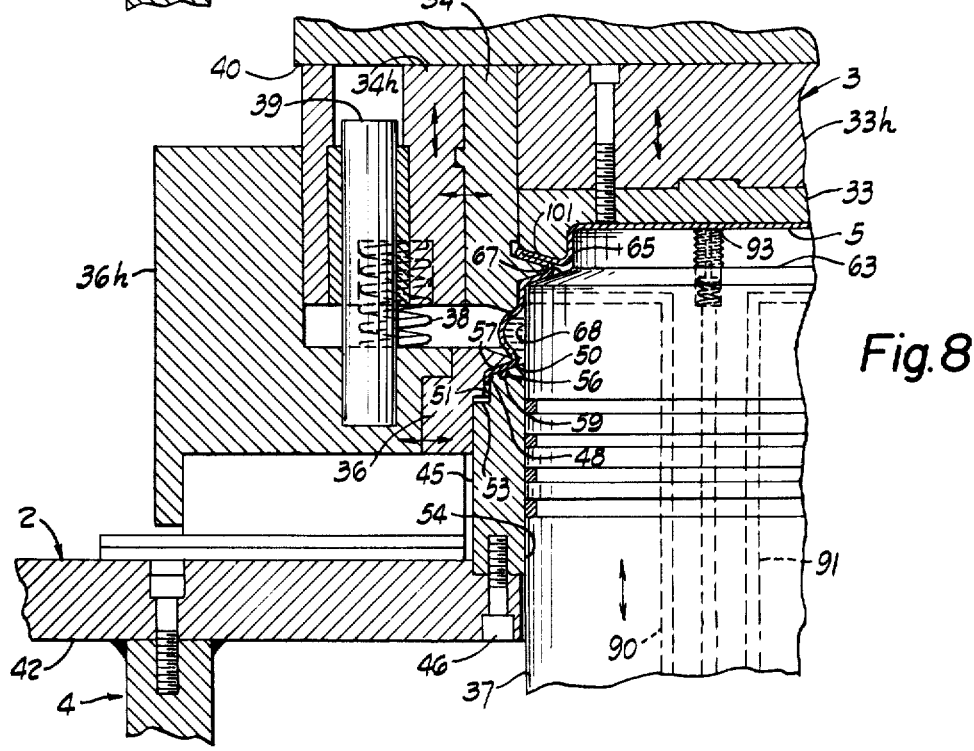

METHOD OF MAKING SHEET METAL PULLEY

This is a division of application Ser. No. 224,778, filed Feb. 9, 1972, now U.S. Pat. No. 3,837,200 granted Sept. 24, 1974.

BACKGROUND OF THE INVENTION

1. Field of the Invention

This invention relates to new and improved single and multigroove sheet metal pulleys such as are used in automobiles and similar and related applications. This invention also relates to a new and improved method and apparatus for forming the grooves in such new and improved single and multigroove sheet metal pulleys from a cup-shaped blank in a single, continuous step without handling, displacement or relocation of the blank during formation of the pulley grooves.

More particularly, this invention relates to a new method or process for forming the grooves in new and improved single and multigroove pulleys, in which the groove(s) are formed and at least one wall of a groove is shaped, folded double or crimped, in a single step from a drawn blank, by the use of external, mechanical force and internal fluid of selectively adjustable volume and pressure, sequentially controlled so that external pressure and motion is exerted on the blank during groove formation and the changing volume and pressure and support, within the blank, together with the location, sizing and closing of the spacing surrounding the blank determine the position and size of the grooves, respectively, and the flow and working of the metal of the blank by and from which the grooves are formed, and wherein the external mechanical force (pressure) applied axially is markedly greater than the applied internal force or pressure which need only be sufficient to prevent internal displacement of the wall or metal during bulging.

2. Description of the Prior Art

Numerous apparatus and processes have been proposed for forming sheet metal pulleys from a single, hollow blank by a plurality of steps depending primarily on the application of an axial force and/or an internal radial force to the blank to force the wall to bulge or flow outwardly, in which the internal force of pressure was of the same or greater order than the axial force and was applied by means of either a deformable, compressible mass or a liquid of adjustable volume disposed within the blank and adapted to fill the interior thereof in accordance with the objectives of the particular apparatus or process.

One of the apparatus and methods which has enjoyed some commercial success and has been used to provide original equipment pulleys for automobiles, and the like, is based upon the disclosures found, for example, in U.S. Pat. Nos. 2,493,053; 2,929,345 and 3,124,090. Briefly, this process comprises stamping and drawing a piece of sheet metal to form a cup-shaped blank having an external flange at the open end and distorting the blank, by means of axial and radial or lateral pressure exerted by compacting a deformable rubber mass, to displace or bulge the adjacent portion of the blank outwardly and then, as a separate step, after the rubber mass has regained its original shape and been removed, upsetting or exerting an axial pressure on said blank, to bend or collapse said bulge into a compact flange. Additional flanges and grooves were formed in the same way with the blank being moved or relocated to a different press for the formation of each separate groove (flange). Sizing and finishing were accomplished on still other apparatus including appropriate sizing rolls after the grooves were formed by the multistep process just described.

While, as noted, this process enjoyed some commercial success, it has nevertheless proven expensive, inefficient and difficult in actual use and has, therefore, been abandoned in whole or in part, as not commercially feasible and practical. This was because of (a) the large number of separate steps actually used in the process; (b) the great amount of handling, moving and relocating of the blank which was necessary during groove (flange) formation; (c) the difficulty in obtaining exact repeatability as to the groove and flange structure in successive pulleys through use of the process; (d) the relatively high cost of the rubber, both initially and as a replacement cost, because of the excessive wear to which the same was subjected; (e) the inability to form symmetrical, properly balanced pulleys in a sufficiently high percentage of instances, with consequent economic loss by rejection or additional manufacturing cost to reform, correct and balance the pulleys.

Other pulleys for the same purpose have been formed by a spinning or rolling process in which expandable roller mandrels disposed within the blank worked and distended the metal, in cooperation with rollers disposed externally of the blank, to form bulges in the blank which were then collapsed by axial pressure to form the groove walls.

Each groove in this latter process was formed separately and the mandrels were retracted away from the pulley after each groove was formed in order to be positioned for formation of the next groove. In this process working and thinning of the metal could be minimized, but not eliminated, by collapsing the blank axially as the interior rollers or segments expanded to form the bulge. The interior rollers or segments were retracted before the bulge was collapsed to form the wall of the pulley groove. Usually both the rollers and the blank were rotated.

Still another prior art process is to split a round, flat blank having a thick edge by forcing a circular rotating tool into the edge intermediate the thickness of the blank to form a single groove pulley. Multigroove pulleys were built up by welding alternate spacers and similarly formed single groove structures together.

Both of these last two processes have also proved quite inefficient and expensive, including tooling costs, in actual use and require a great many steps, as well as expensive mandrels and equipment in addition to the presses. Both, also fail to obtain the object of a satisfactory sheet metal pulley which is both uniform in concentricity, runout and balance relative to other pulleys made in the same way and economically and technically feasible for mass production.

SUMMARY OF THE INVENTION

It is, therefore, a general object of this invention to provide a new and improved, single or multigroove sheet metal pulley for automotive and industrial uses, and to provide a new and improved and more effective method and a new and improved and more effective apparatus for forming the grooves in single and multigroove sheet metal pulleys for automotive and industrial uses.

Another object of this invention is to provide new and improved, single and multigroove sheet metal pulleys which are uniform in structure and quality; which are efficiently and economically manufactured and used; which include at least one groove having at least one folded or crimped wall; and which are formed by means of a single-step, continuous method and in an apparatus which provides repeatability whereby successive pulleys, which are to be of the same size and characteristics, have a groove or grooves which are essentially duplicates of each other and the same in structure.

Further objects of this invention include the provision of a new and improved method and a new and improved apparatus for making new and improved single and multigrooved sheet metal pulleys, each of which provides pulleys which have improved concentricity and balance over other sheet metal pulleys commonly available at costs which are economically practical for mass production and use; which are more economically produced than is common in the art with which this invention is most closely related and associated; which have repeatability; which conform exactly to the desired, predetermined external shape and size; and in which the metal does not have drawn or thin spots and is not of graduated or other irregular thickness because of the method or apparatus used in formation of the grooves.

Still other objects of this invention include the provision of a new and improved process and new and improved apparatus for providing a new and improved single or multigroove sheet metal pulley which includes new and improved means for confining a forming fluid within a blank for making single and multigroove pulleys; which utilizes a forming fluid disposed within the blank, but requiring no other container; and which includes new and improved means for effecting a seal between a blank and a forming die to retain fluid and fluid pressure within the blank.

Still further objects of this invention include the provision of a new and improved process for forming the grooves in single and multigroove sheet metal pulleys for automotive and other industrial uses and applications which comprises a single step; which forms the pulley groove or grooves from a one-piece blank without requiring intermediate handling thereof; which utilizes a hollow blank and maintains and protects the blank against undesirable collapse and the metal thereof against undesired internal flow, buckling, drawing, thinning, or the like, by fluid and fluid pressure disposed and exerted within the blank; which has new and improved method and means for sealing the edges of the blank to prevent fluid and fluid pressure from escaping therefrom; which flows and distorts the metal of the blank along predetermined paths and to and into predetermined, single or multigroove configuration in a single step; which is useful for forming grooves in an individual pulley which are of the same or different diameter and/or the same or different pitch; and which utilizes a relatively low internal pressure or force which need be only sufficient to prevent internal collapsing or bulging during the initial formation of a flange (bulging) and a large external, axial force to effect metal flow and groove formation.

A still further object of this invention is to provide new and improved apparatus for forming the groove or grooves in single and multigroove pulleys embodying this invention and to provide such apparatus having new and improved means for containing a forming fluid within the blank and new and improved means effecting a seal with the blank from which the pulley is formed.

A still further object of this invention is to provide a new and improved single or multigroove sheet metal pulley, a new and improved process for making the same and new and improved apparatus for making single and multigroove sheet metal pulleys, each of which obtains one or moree of the objects and advantages set forth above.

These and other objects and advantages of this invention will appear from the following description of preferred and modified embodiments thereof, reference being had to the accompanying drawings.

BRIEF DESCRIPTION OF THE DRAWING

FIG. 7 is a view similar to FIG. 6 illustrating a subsequent stage of said method, wherein the wall of the first groove is being folded or crimped.

FIG. 8 is a view similar to FIG. 7 illustrating a subsequent stage of said method wherein the bulge defining the second groove is being formed.

DESCRIPTION OF THE PREFERRED EMBODIMENTS

Figure 1:
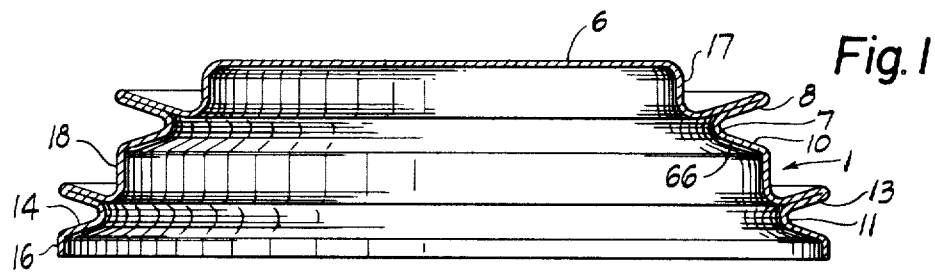
FIG. 1 is a vertical sectional view of a new and improved pulley embodying this invention and having grooves made in accordance with the method of this invention on apparatus embodying this invention.

A pulley embodying this invention is indicated generally at 1, FIG. 1, and is depicted as a two-groove pulley in which the grooves are of different diameter (ball diameter) but have the same pitch or width. It is to be understood, however, that pulleys embodying this invention may have a greater or lesser number of grooves than pulley 1, may have grooves, if multigrooved, of the same or different diameters and/or of the same or different pitch or width.

Pulley 1 is particularly adapted for use in automotive application in connection with automobile engines, fans, crankshafts, and the like, although such pulleys may be used in other industrial applications or wherever a low cost, but balanced, concentric, uniform and efficient pulley is useful or desirable.

Pulley 1 is formed of sheet metal and is distinguished not only by the fact that it is formed by the one-step, continuous process of this invention from a blank without need for relocation or resetting of the partially formed pulley during formation, but, also, by the fact that it is of sufficiently low cost and uniform standard to be practical for mass production as original equipment for automobiles and similar mass-produced items.

Pulley 1 is made in apparatus, indicated generally and schematically at 2 in FIGS. 5–9, inclusive, and by the method illustrated in FIGS. 5–9, inclusive. Said apparatus 2 and method produce pulleys having the structure, characteristics and function of the pulley 1 as described herein.

Apparatus 2 comprises a plurality of dies and holders therefor, indicated generally at 3, generally referred to herein as die(s) and to be hereinafter more fully described.

Dies 3 are mounted in a conventional press, indicated generally at 4, FIGS. 5–9, inclusive. Dies 3 are adapted to be moved (slid and reciprocated) linearly in the matter and sequence described below, by hydraulic cylinders or motors, not shown, in accordance with methods of actuation and displacement or movement which are well-known in the art, do not form part of the present invention and need not be and are not further described herein.

Figure 2:
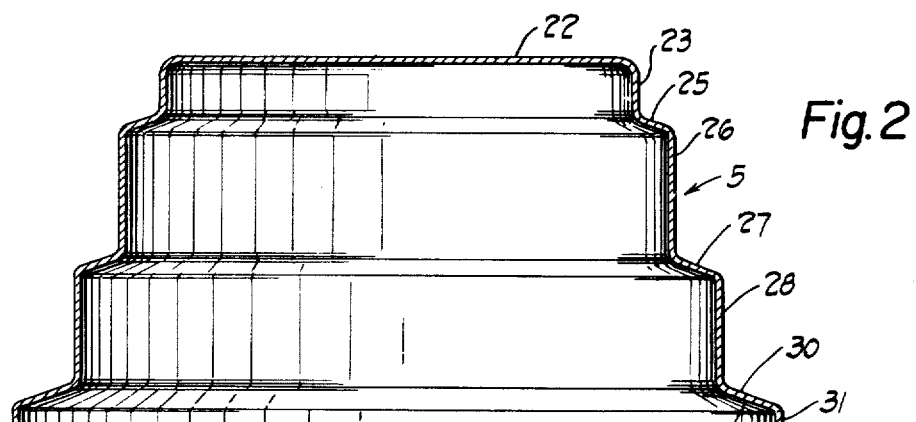
FIG. 2 is a vertical sectional view of a blank from which the pulley of FIG. 1 is formed.

Pulley 1 is formed from a blank 5, see FIG. 2, which is drawn and prepared in a conventional way in apparatus not shown.

Pulley 1 includes a transverse, horizontal as viewed, hub portion 6, FIG. 1, a first (hereinafter sometimes called inner) groove 7 having sides or walls (inner and outer, respectively, relative to the hub 6) 8 and 10, respectively. Pulley 1 also includes a second (hereinafter sometimes called outer) groove 11 having sides or walls (inner and outer, respectively, relative to the hub 6) 13 and 14, respectively.

Here and throughout this patent, for convenience of nomenclature, direction is indicated relative to the hub of the finished pulley and blank, with portions nearer the hub being designated inner or first and those further therefrom, outer or second, and so on.

Pulley 1 also, conveniently and preferably includes an axially extending flange portion 16, remote from the hub, which stiffens the completed pulley.

The inner sides or walls 8 and 13 of the grooves 7 and 11, respectively, are folded or crimped, as shown, during the process of forming pulley 1 and, as such, add strength and rigidity to the pulley.

Also, in pulley 1, the groove 7 is spaced from the hub by an axially extending wall portion 17, and the grooves 7 and 11 are spaced apart by an axially extending wall portion 18. Further, as shown, the grooves 7 and 11 are of different diameters (ball diameters) and the same width. It is to be understood, however, that pulley 1 could embody a greater or lesser number of grooves, that the grooves may be of the same or different diameters; that the grooves may be of the same or different widths and that the grooves may be juxtaposed to each other and/or the hub, respectively, or spaced apart a greater or lesser distance than shown, all within the scope and objects of this invention.

As noted above, pulley 1 is formed from blank 5, FIG. 2. Blank 5 is of a stepped cup-shape and includes a horizontal hub portion 22 which becomes the hub portion 6 of the pulley 1, a first axially extending wall portion 23, which forms the wall 17 of pulley 1, a first angular, transverse portion 25, which locates the axial position of the inner side or wall 8 of the inner groove 7, a second axially extending wall portion 26 which forms the inner side or wall 8 of the inner or first groove 7, a second angular, transverse portion 27 (low pitch, conical surface), which locates and forms the outer wall 10 of the inner groove 7, a third axially extending wall portion 28 which forms the wall portion 18 and the inner side or wall 13 of the outer groove 11, a third angularly disposed surface 30, which forms the outer side or wall 14 of the outer groove 11, and a fourth axially extending wall portion 31 which forms the flange 16 of the pulley 1.

The process of this invention comprises a continuous, single step, sequential stage process wherein pulley 1 is formed from blank 5 by a continuous displacement of the metal of the blank into the desired shape, i.e., by bulging, crimping and groove formation, the continual or substantially continual mechanical displacement of the dies 3 of the apparatus in predetermined order and sequence while continuously coordinating and adjusting the volume of liquid within the blank, and holding, or changing, but always controlling, the presssure thereof, so as to control, internally, the shaping and displacement of the metal in the blank.

As noted above, the dies 3 are mounted on a conventional press and are actuated to reciprocate by hydraulic cylinder(s)) or motor (s) (not shown) in the usual way. It is a feature of this invention, in its preferred form, that all of the forming dies move or are displaced in an axial direction during formation of the pulley, although those die segments which shape the interiors of the respective grooves are also mounted on the press for radial reciprocal motion, as well, so that they may be withdrawn from the completed pulley.

Figure 5:
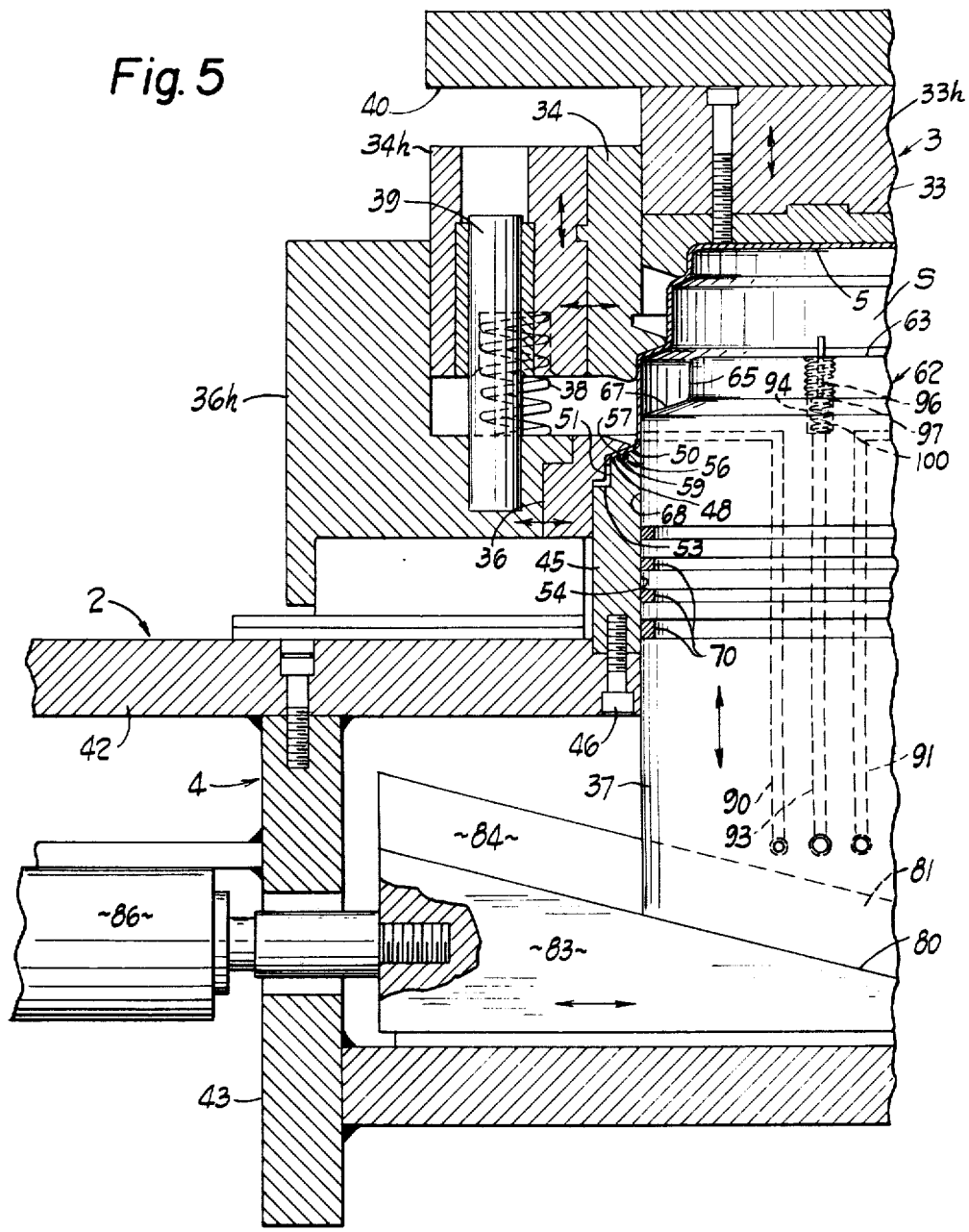
FIG. 5 is a schematic, vertical sectional view illustrating the blank of FIG. 2 positioned in apparatus embodying this invention for processing in accordance with the method of this invention, prior to groove formation.

Referring now to FIG. 5, the movable exterior dies necessary to form the pulley 1 are indicated specifically at 33, 34 and 36, respectively, and the movable interior die is indicated at 37 and they are conveniently mounted on and move with holders 33h, 34h and 36h, respectively, and die and holder are generally referred to hereinafter by the term "die" which contemplates both the die and the holder whether formed as integral or multipiece units.

Die or ram 33 reciprocates axially relative to the blank and pulley and is displaced selectively upwardly and downwardly by the aforementioned hydraulic cylinder or motor to and for the purpose and in the sequence to be hereinafter more fully described.

Dies 34 and 36 are segmented, conveniently in three parts. The segments of die 34 are carried on the respective segments of lower die 36 and are displaced or reciprocated radially or horizontally with the lower die 36.

In addition, the segments of die 34 are biased upwardly, as viewed, by springs 38 into the relative position shown in FIG. 5. Die 34 is forced or slid downwardly, as viewed, on the posts of pins 39, which are supported on die 36, by the laterally extending flange or lip 40 on the upper die 33. Flange 40 engages the intermediate die 34 as the upper die or ram 33 is displaced downwardly. Lower die segments 36 are reciprocable radially, as noted above, and when so reciprocated carry the die segments 34, respectively, in the same motion.

Press 4 includes a table 42 and a base 43. A cylindrical block or fixed die 45 is mounted on table 42 by suitable means, such as screws 46. Die 45 supports the blank 5 when the same is positioned in the press. To this end, die 45 includes a shaped upper end, as viewed, indicated generally at 48, having an angularly disposed top portion or surface 50 which complements in size and shape the third angular transverse wall portion 30 of blank 5 to the end that surface 50 supports the lower or exterior part of the outer side or wall 14 of outer groove 11. The upper end 48 of die 45 also includes a vertical or axial wall portion 51 which fits inside the fourth axially extending wall portion of flange 31 of the blank 5. The angle between surfaces 48 and 51 of die 45 in the same or substantially the same as that desired in the finished pulley 1 and formed preferably in the blank 5 so that die 45 both supports and centers the blank 5 in the apparatus 2. Die 45 may be further stepped, as at 53, to provide for increased thickness and strength as necessary and desired. The interior surface 54 of die 45 is cylindrical and finished smooth for coaction with and support of the interior die 37, as will more fully appear.

In addition, the surface 50 includes a continuous sealing means 56 for engaging and sealing in fluidtight relationship against the adjacent side or surface of blank 5. The sealing means 56 is essentially fluidtight within the pressures experienced or used in forming the pulley 1 from blank 5 to the end that none or substantially none of the forming fluid or liquid can escape from the interior of the blank 5 between die 45 and blank 5.

When a metal-to-metal seal is insufficient, sealing means 56 preferably comprises an O-ring or gasket 57 disposed in a suitably shaped groove 59 formed in the surface 50 of die 45. The depth of groove 59 is somewhat less than the axial thickness of gasket 57 to ensure effective sealing engagement between the gasket 57 and surface 60, FIG. 2, of blank 5 while not preventing proper load bearing engagement between surfaces 60 and 50.

Die 37 is cylindrical and has a close sliding fit with the interior surface 54 of die 45.

Die 37 is adapted to reciprocate longitudinally, vertically, as viewed, relative to the axis of the blank and pulley when the same are within the apparatus 2.

The upper end 62 of die 37 is shaped complementary to the hub end, hub and wall portion 6 and 17, respectively, of the completed pulley and hub and wall portion 22 and 23, respectively, of blank 5 so that the hub end of the pulley is, in fact, formed or held to shape about the die 37. To this end, die 37 has an upper, as viewed, horizontal surface 63 and an axially extending surface 65. In order to support and form the lower side 66, FIG. 1, of the outer side or wall 10 of the groove 7, die 37 also includes an angularly extending surface 67 between the axial vertical wall portions or surfaces 65 and 68, respectively. Surface 67 is of a dimension equal to the distance between the interior surfaces of walls 23 and 28 with the angle between surfaces 67 and 68 of die 37 being the same as the interior angle between wall portions 27 and 28 of blank 5.

Die 37 is preferably and conveniently provided with one or more sealing rings 70 located in its lateral periphery so as to coact in the usual manner with surface 54 of die 45.

Die 37 is reciprocated by suitable means. To this end, the lower end 80, as viewed, of die 37 is preferably and conveniently formed at a bias with a slot, track or groove 81 therein. A complementary wedge 83 with a tongue 84 for coaction with groove 81 is also provided and die 37 is supported thereupon. Hydraulic cylinder or motor means, shown schematically at 86, reciprocates wedge 83 transversely, as viewed. As wedge 83 is moved rightwardly, as viewed, by cylinder 86, it lifts die 37 and as it is moved leftwardly it lowers the die The pitch of wedge 83 is, of course, sufficient to move the ram the distances and in the sequence required by the process of this invention to be hereinafter more fully described.

Means is also provided to supply oil or other suitable fluid, hereinafter called "oil," and to control the volume and pressure thereof within the blank 5 and exteriorly of die 37 above, as viewed, the sealing rings 70 during pulley formation. To this end inner die 37 also includes a plurality of tubes or conduits 90 and 91, respectively, which provide communication laterally of the die 37 through the surface 68 and a tube 93 which provides communication with the space S above die 37 and within blank 5.

The flow of oil through the tubes 90, 91 and 93 and into and out of the space, adjacent the die, as well as the pressure of the oil in the space(s) surrounding die 37, is controlled by appropriate valves and pump(s) as will appear more fully below.

Further, tube 93 also preferably includes means whereby air may be evacuated from the top of space S adjacent the interior of the hub 22 of blank 5 as the oil or liquid flows into the said space.

To this end, tube 93 is counterbored at its top as at 94 and a spring-biased extension tube, indicated generally at 96, is disposed therein.

Extension tube 96 includes a central tube portion 97 and a base 99 having a close sliding fit with the wall of the counterbore 94. Extension tube 96 is biased outwardly, upwardly as viewed, by spring 100 and is retained within counterbore 94 by a snap ring, pin or other suitable means, not shown.

Tube portion 97 extends outwardly from the open and of tube 94 a sufficient distance to provide an air release or escape for the space S above die 37 so that the space can be filled with liquid. Extension tube 96 telescopes within tube 93 so that the die 37 may be seated fully within blank 5 and against the inside of hub 22.

Notches 102 at the end portion 97 permit flow of air into the tube portion even when the tube rests against the inside wall of hub 22 of the blank 5.

Further, if desired, a vacuum pump may be interconnected with tube 93 to speed the evacuation of air from the space S.

FIG. 5 depicts the apparatus 2 shortly before pulley formation by the process of this invention is begun.

The blank 5 is positioned on die 45 and is gripped by die 36. Die 34 is in its upper or extended position, as shown, die or ram 33 has been lowered into contact with the hub 22 of blank 6 and die 37 is moving upwardly so as to engage surface 67 against the interior surface of wall portion 27.

Figure 6:
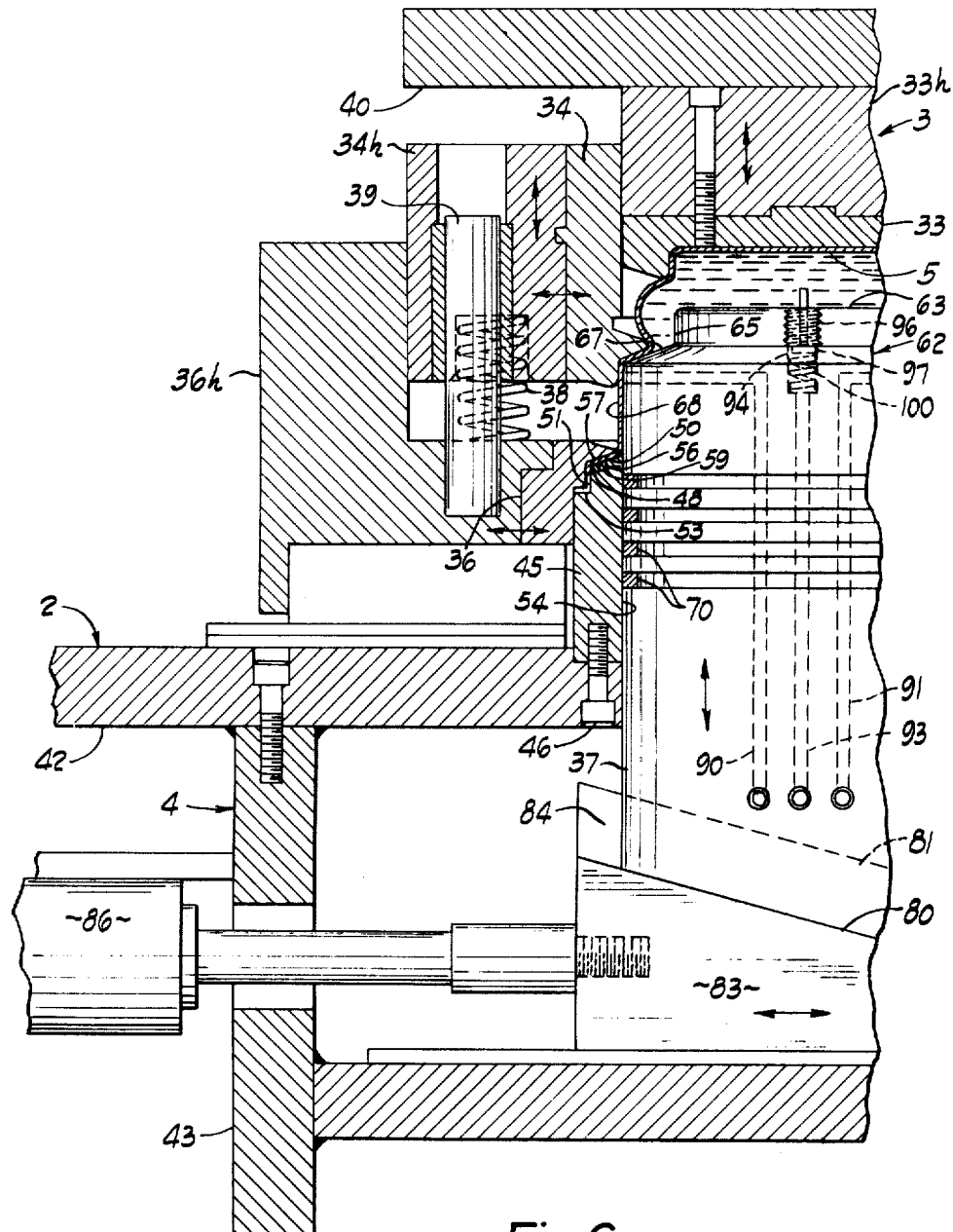
FIG. 6 is a schematic vertical section similar to FIG. 5 illustrating a stage in pulley groove formation, according to the method of this invention, wherein the bulge defining the upper wall of the first groove is being formed.

FIG. 6 shows a later stage in the process of this invention wherein a quantity of oil (liquid) has been introduced into the space S above the die 37 and within the blank 5 through tube 94 which was thereupon connected with an exhaust port, not shown, so that the air above the oil could be exhausted via tube portion 97 as die 37 continued to move upwardly until, as shown, surface 67 had seated against the wall portion 27 of blank 5, at which time the space S was completely full of oil. Ram 33 had then continued its descent until the position shown in FIG. 6 was reached. The descent of ram 33 had exerted a mechanical force on the wall of the blank, as well as creating a pressure within the oil, as the same was (is) incompressible, with the result that the high mechanical force on the blank wall plus the pressure of the oil on the interior thereof caused the wall portion 26 of blank 5 to buckle or bulge outwardly since it is and was unsupported, as shown, in that direction. Wall portion 23 of blank 5 remained rigid as it was and is fully supported within the die 33. Wall portion 28 remained straight, as shown, or buckled or bulged outwardly only slightly as engagement between surface 67 and the interior of wall portion 27, the bends in the blank and the engagement of the surface 54 of die 37 with the wall portion 28 of blank 5 all function together to prevent any deleterious transmission of force and/or bulging of the wall portion 28.

As the process proceeds beyond the stage shown in FIG. 6, the die descends (as viewed) continuously and the bulge enlarges until it is sufficient for groove formation. A valve controlling tube 93 is then actuated in response to the distance traveled by ram 33, time elapsed, or pressure within the space S resulting from the movement of ram 33 and the oil flows from space S via tube 93.

Ram 33 continues its descent and crimps the wall portion 26, as shown in FIG. 7, to form the inner wall 8 of inner groove 7. Wall portion 26 is crimped by being squeezed between ram 33 and the surface 101 of die 34. While the oil continues to flow from the space S until the space is fully or substantially fully evacuated and the crimp to form wall 8 is completed, as shown in FIG. 7. And, of course, as shown in FIG. 7, the extension tube 96 has been telescoped by ram 33 into the tube 93.

As ram 33 continues its downward movement, as viewed, valves or controls are actuated to permit fluid to be pumped through conduits 90 and 91 against the wall portion 28 of blank 5 which bulges, as shown in FIG. 8, under the effect of the collapsing (downward, as viewed) force of ram 33 and die 34 (die 34 now being displaced downwardly by the engagement of flange 40 of ram 33 therewith) and the outward pressure of the oil laterally of die 37, which is preferably retracted (lowered) at the same rate as ram 33 descends so that the relationship between ram 33 and die 37 remains constant as the new bulge is being formed.

Again, once the second bulge is of sufficient size, the valves and controls are actuated to permit flow of oil from the space surrounding die 37 and within the bulge in wall portion 28. The continued movement of the ram 33 and dies 34 and 37 then crimps and forms the inner wall 13 of the lower groove 11 between the surface 102 of die 34 and the die 36, as shown in FIG. 9.

Figure 9:
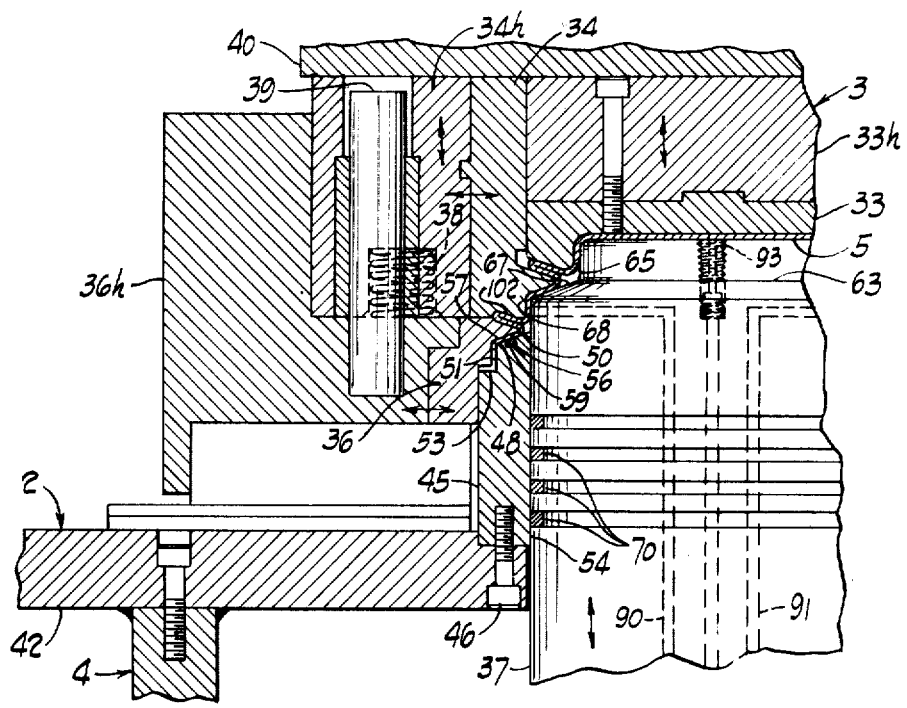
FIG. 9 is a view similar to FIG. 8 illustrating a subsequent stage of said method wherein the wall of the second groove is being crimped.

Pulley 1 is shown in its completed form in FIG. 9 with the process of this invention completed.

Once formation of pulley 1 is completed, as in FIG. 9, the movable dies are withdrawn, the pulley removed, a new blank positioned, and the cycle is repeated.

Figure 3:
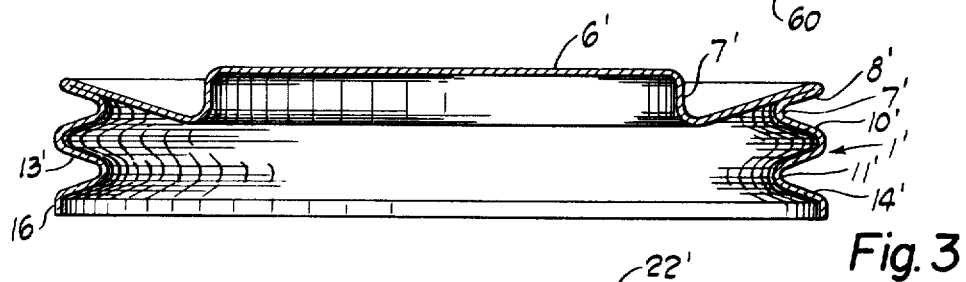
FIG. 3 is a vertical sectional view of another pulley embodying this invention and also made in accordance with the method of this invention on apparatus embodying this invention.

FIGS. 10–13, inclusive, depict stages of the process of this invention forming the pulley 1' shown in FIG. 3 in which the grooves are of the same diameter and width.

In FIGS. 10–13, like numbers refer to like parts and portions as in FIGS. 5–9, inclusive, and the FIGS. 10–13 show stages in the groove formation in a manner similar to FIGS. 5–9, inclusive, and prime numbers refer to similar parts and portions modified because of the different shape of pulley 1' viz-a-viz pulley 1.

Figure 4:
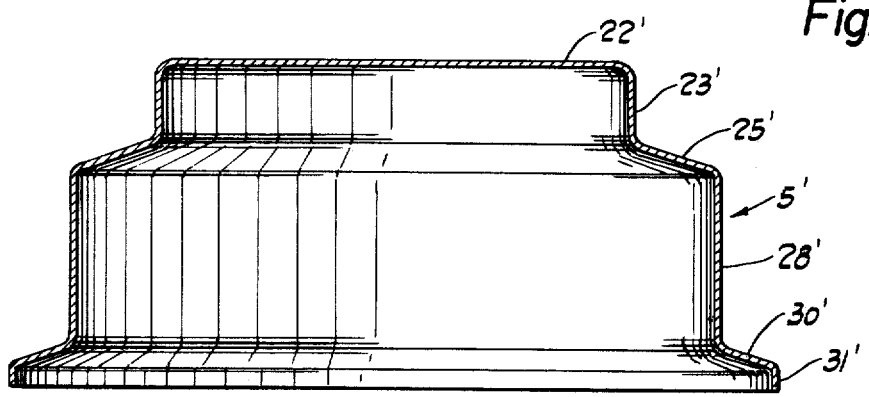
FIG. 4 is a vertical sectional view of a blank from which the pulley of FIG. 3 is formed.

Pulley 1' has inner and outer grooves 7' and 11', respectively, which are of the same diameter and size. Pulley 1' is formed from blank 5', FIG. 4, with both the inner and outer grooves 7' and 11' being formed from wall portion 28'. More particularly, the outer wall 10' of inner groove 7' and the inner wall 13' of outer groove 11' are all formed from axial wall portion 28' of blank 5', whereas the inner side of inner wall 8' is formed by angular wall portion 25' of blank 5' and the outer wall 14' of outer groove 11' is formed by angular wall portion 30' of blank 5'.

The dies 33', 34' and 36', respectively, in FIGS. 10–13, inclusive, are, of course, changed, viz-a-viz dies 33, 34 and 36, respectively, in FIGS. 5–9, inclusive, to be appropriate for the grooves of pulley 1' instead of pulley 1. The die carriers remain the same.

Otherwise the process is substantially the same, although the flow of metal within the blank is different. In the process as disclosed in FIGS. 10–13, inclusive, movement of the dies and, in particular, of die 33 and inner die 37 and control of the forming fluid is such as to sequentially, but in a single step, (a) form the bulges 104 and 105 for the grooves 7' and 11', respectively, see FIGS. 11 and 3, (b) complete the upper bulge 104 for the inner groove 7', (c) crimp the inner wall 8' of the inner groove 7', (d) complete formation of the lower bulge 105, and (e) form the outer wall 10' of the upper groove 7' and the inner wall 13' of the lower groove 11' about die 34'.

Figure 10:
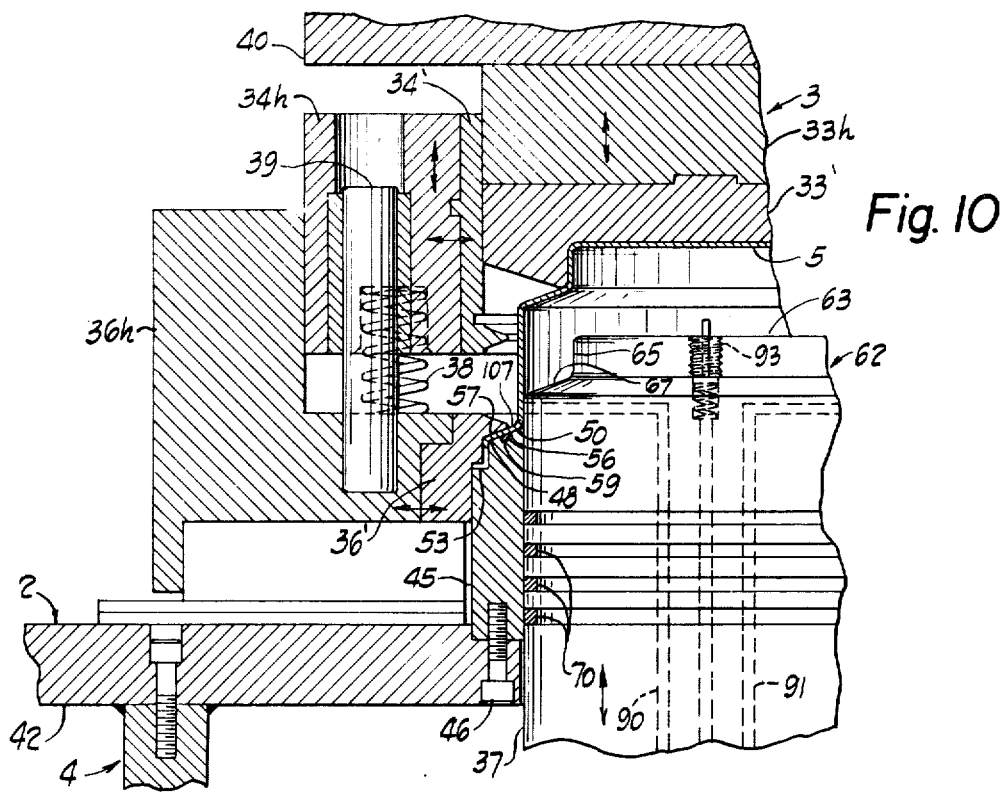
FIGS. 10-13, inclusive, are views similar to FIGS. 5-9, inclusive, illustrating the method and apparatus of this invention forming the grooves for the pulley of FIG. 3 from the blank of FIG. 4.

More particularly, FIG. 10 shows the apparatus prior to groove formation, as the inner die 37 is being displaced upwardly to position the end 62 thereof against the hub 22. The die 36' has gripped the wall of blank 5' with seal 56' preventing escape of fluid from between the surface 50 of die 45 and the lower surface 107 of angular portion 30' of blank 5'.

The air is evacuated from the space between the top 62 of die 37 and the hub 22 of blank 5' until the die seats against the hub. Further, although the ram 33 is shown positioned against the blank before the die 37, it is to be understood that the die 37 could be positioned first or even that the die could be so located, prior to recycling, that the blank would be seated properly relative thereto at the same time the blank is seated on die 45, especially if extension tube 96 is omitted from the apparatus.

In any event, once dies 33 and 37 are seated against the hub, a forming fluid such as oil is forced through the conduits 90 and 91 at the same time downward movement of the ram 33 is initiated or continued, if the apparatus has been timed so that the descent (motion) of ram 33 need not be halted while the air is evacuated from within the blank and die 37 is positioned against the hub.

Figure 11:
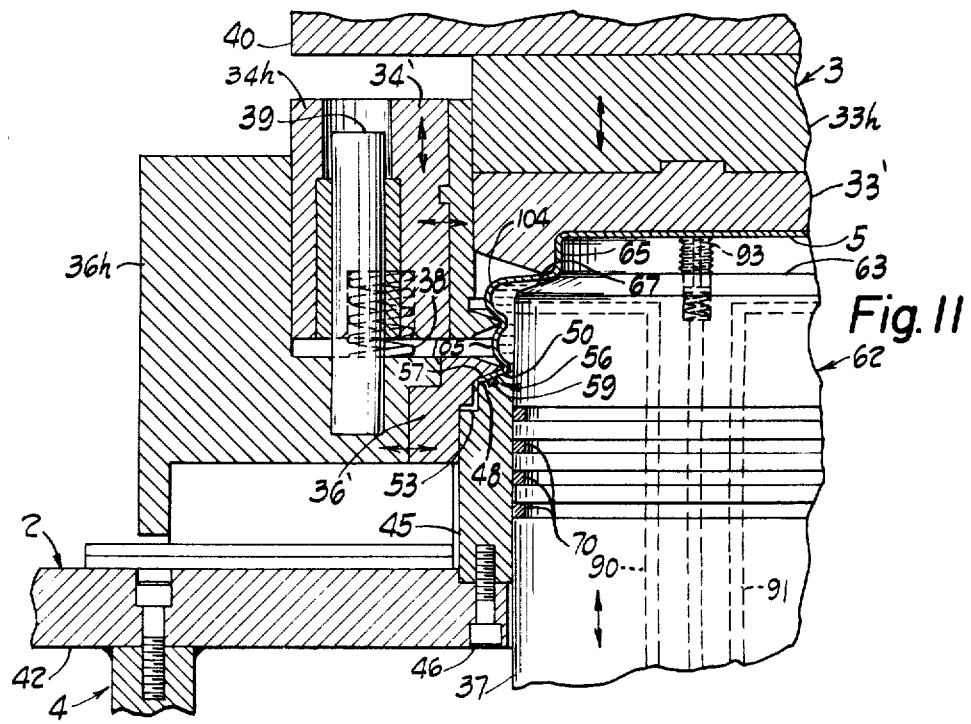

This movement exerts an axial force on the wall portion 28' of blank 5' which buckles or bulges outwardly, as shown at 104 and 105, because the internal liquid pressure prevents inward buckling. Further, because of the relative location of the dies and conduits, the downward movement of die 34 induced by flange 40 of ram 33, the initial bulging occurs or occurs to a greater extent at the level of the upper groove as shown in FIG. 11, i.e., at upper bulge 104.

Figure 12:
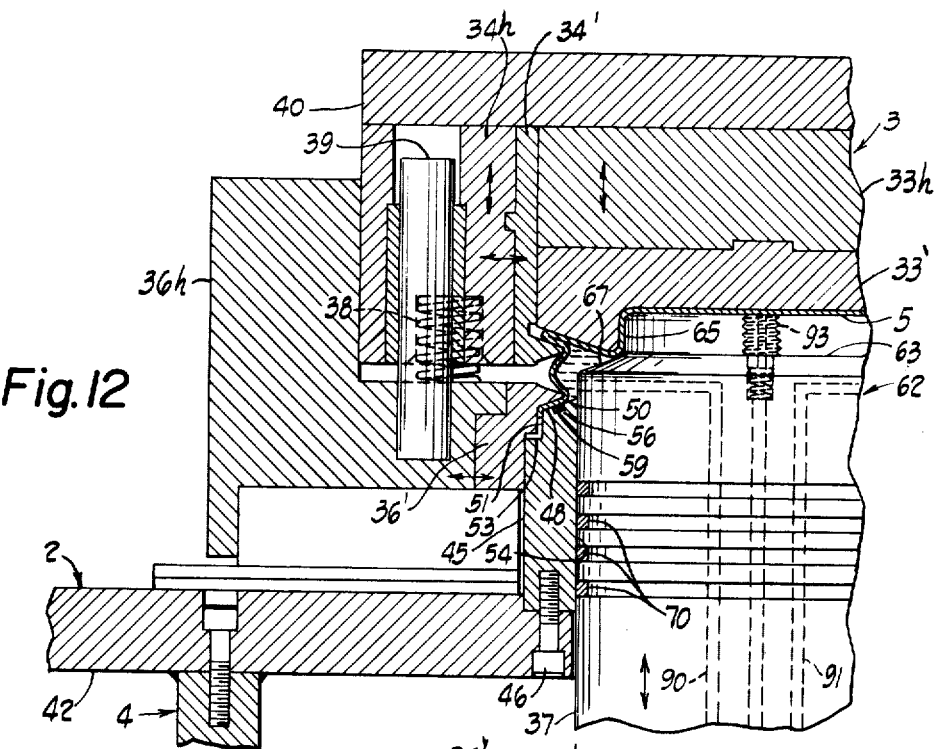

Once this bulge has reached the desired size, the oil is released and continued downward movement of the ram 33 displaces the oil from the upper bulge and crimps the inner wall 8' of the inner groove 7', as shown in FIG. 12.

Figure 13:
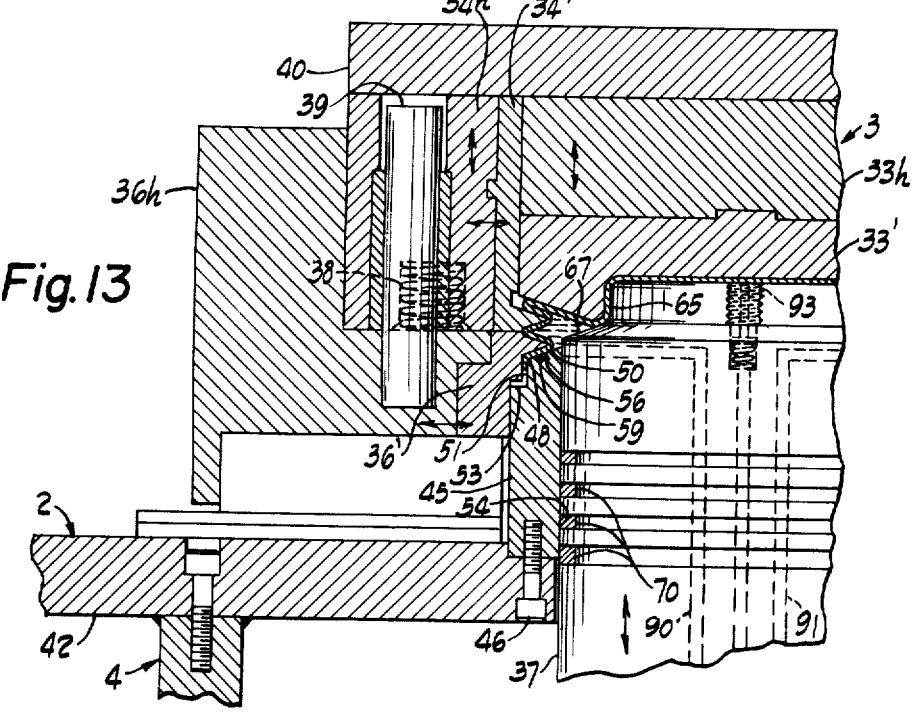
Figure 15:
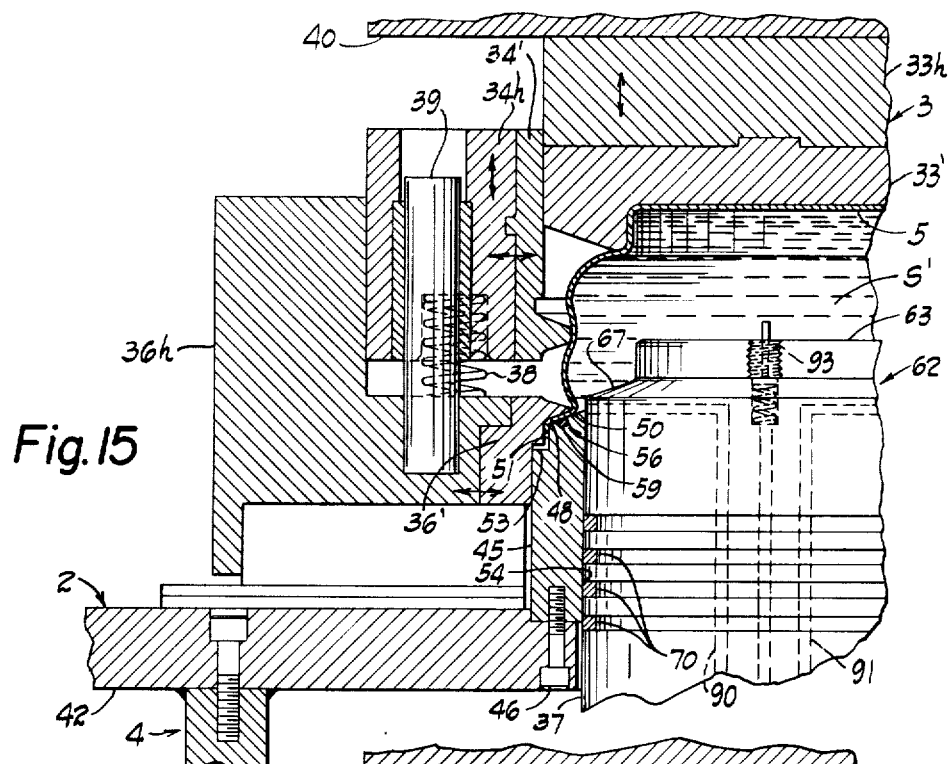
FIGS. 15–18, inclusive, are schematic sectional views showing apparatus embodying this invention and different stages in the process of this invention during the formation of a pulley as shown in FIG. 14.
Figure 16:
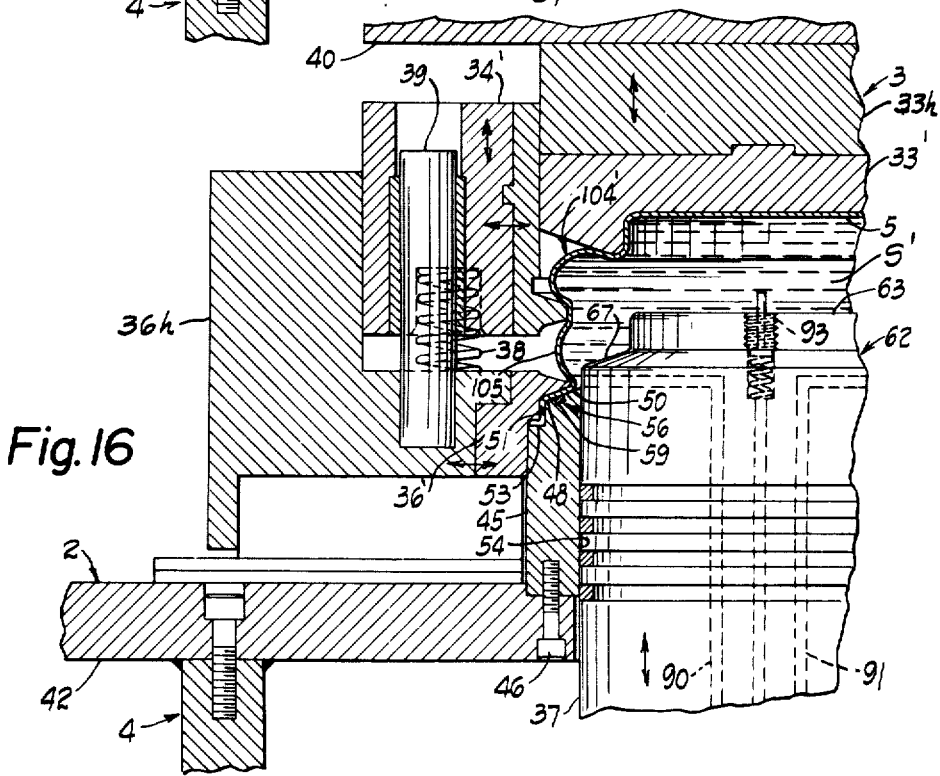
Figure 17:
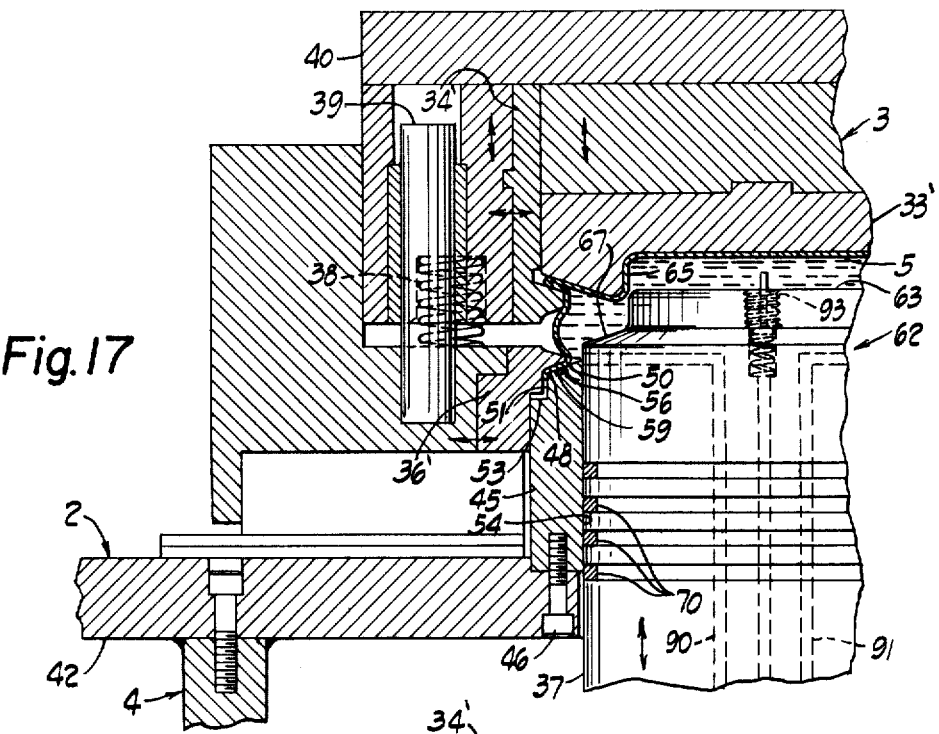
Figure 18:
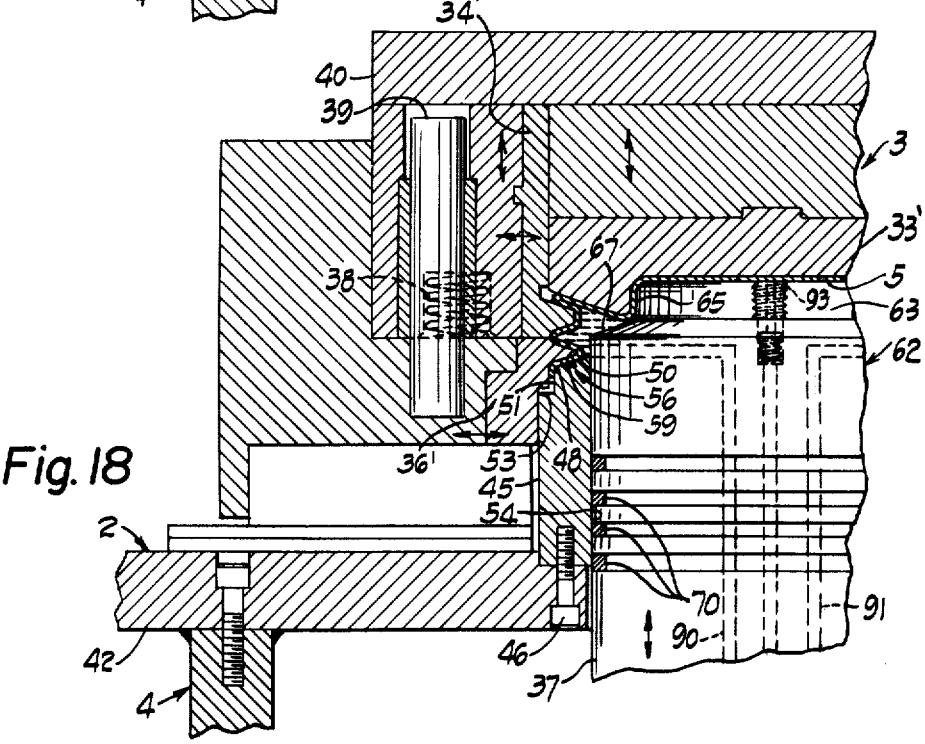

Then, as the ram 33 continues its descent, the fluid volume about the inner die 37 and within the blank 5' is adjusted and the pressure increased so that the further collapse of the wall under the force of ram 33 is prevented as the ram 33, and, therefore, die 34, continues its travel, first completing bulge 105 and then, as travel of die 34 is completed, completing formation of walls 13' and 14', respectively, of pulley 1' and of the outer groove 11' thereof, as shown in FIG. 13.

The movable dies are then retracted, the completed pulley 1' is removed and the cycle repeated, as desired.

Figure 14:
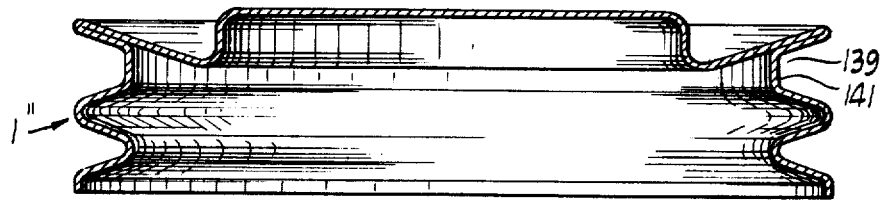
FIG. 14 is a vertical sectional view of another pulley embodying this invention which is made in accordance with the method of this invention on apparatus embodying this invention from a blank as in FIG. 4.

Pulley 1'', FIG. 14, is similar to pulley 1' in FIG. 3 except that in this instance, while the grooves are of the same diameter, the upper groove, 139 as viewed, is wider and has a flat bottom portion 141. Pulley 1'' is formed from a blank having the same shape as that in FIG. 4, but having a greater axial length at wall portion 28'.

Like reference characters in FIGS. 14–18, inclusive, refer to the same parts and portions as in FIGS. 3, 4 and 10–13, inclusive.

The single-step process depicted in FIGS. 15–18, inclusive, is similar to that depicted in FIGS. 10–13, inclusive, utilizes the same one-step continuous motion, i.e., continuous displacement of the ram process as depicted in FIGS. 5–9 and 10–13, both inclusive, respectively.

In this instance, however, the inner die 37 remains stationary and could, therefore, be formed as a part of die 45, if desired. The bulging and groove formation, as depicted in FIGS. 15–18, inclusive, is accomplished in the same order and manner as is depicted in FIGS. 10–13, inclusive, except that the bulging, crimping and wall and groove formation is controlled by the movement of the external dies and ram 33 plus control of the internal volume and pressure of liquid within the blank 5'' and above and about the upper (as viewed) end of the die 37. Once again the pressure and volume of the liquid within the space S' together with the proper initial spacing between the adjacent dies 33' and 34' and 36', FIGS. 15–18, inclusive, respectively, cause the bulges 104' and 105' to form and as the pressure increases within the space S' the volume of the forming fluid is reduced so that the inner wall of the inner groove may be crimped and the walls 10' and 13' of grooves 139 and 11', respectively, may be formed.

Here, again, once the pulley is completed the dies are withdrawn, the pulley removed and the cycle repeated, if desired.

Thus, the process of this invention is a continuous, single-step process. A relatively large axial pressure or force is continuously exerted on a blank and the volume and pressure of a forming fluid, such as oil, within the blank and the movement of the forming dies is controlled to cause the metal to bulge outwardly and then to be crimped between or pressed against the dies to form the groove. The size of the bulge is controlled by controlling the release of the fluid within the blank so that the dies which cause the bulging also shape and form the grooves and the walls thereof as set forth. The pressure of the fluid is also controlled so that metal flow is always in the desired direction and the fluid volume is controlled, in part, as noted, in response to changes of pressure thereof, as by releasing fluid to reduce the volume thereof, once the bulge is formed and crimping is to begin to reduce the interior volume of the blank to be consistent with the volume thereof to exist after a wall is crimped or otherwise formed.

Figure 19:
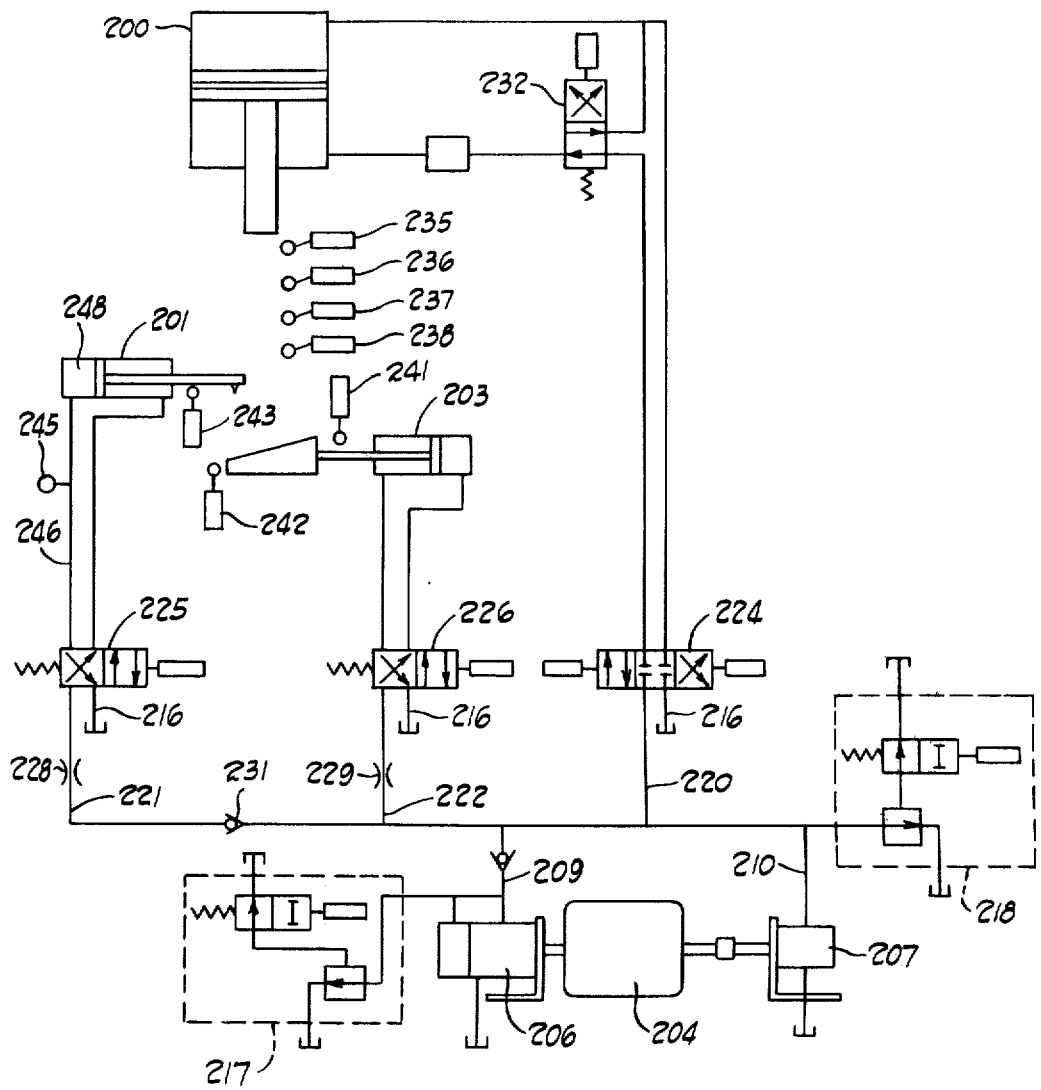
FIG. 19 is a diagrammatic view illustrating the hydraulic system of apparatus embodying the invention for controlling the movement of the apparatus.

FIG. 19 depicts diagrammatically suitably hydraulic system for use in and for operating apparatus embodying this invention and particularly adapted for carrying out the process as depicted in FIGS. 5–9, inclusive. The hydraulic circuit is, of course, interrelated with a suitable electrical circuit activated by suitable switches, including limit switches, and the like. Mechanical parts, indicated diagrammatically in FIG. 19, are the same as the correspondingly referenced parts, respectively, in FIGS. 5–9 inclusive.

More particularly, in FIG. 19, reference character 200 indicates the double-acting operating cylinder for the ram 33, reference character 201 indicates the double-acting operating cylinder(s) for the carrier(s) which control the movement of reciprocation of the die(s) 36 and the lateral movement of die(s) 34, and reference character 203 indicates the doubleacting operating cylinder which controls the reciprocation of the inner die 37, either by lateral movement of the wedge, as preferred, or by a direct connection with the die, i.e., by having the cylinder in axial alignment with the die and the die connected to or formed as a part of the piston.

Note, where the singular is used here and throughout this description, it will be understood to comprehend the plural where a plurality of similar or similarly functioning parts have been or are indicated, as, for instance, when the dies are described as segmented.

Oil is supplied to the respective hydraulic cylinders by a suitable motor driven pump(s) through appropriate conduits having valves controlled by suitable timers, or limit or pressure switches.

Conveniently, a conventional electric motor 204 is utilized to drive two pumps; one, 206, a high-volume, low-pressure pump for rapid advancement and retraction of the cylinders before and after actual pulley formation, and one, 207, a low-volume, high-pressure pump for advancing the dies (rams) during pulley formation.

The discharge lines 209 and 210 from the pumps are interconnected and a suitable check valve 212 protects the lowpressure pump. Each pump has an intake line 213 and 215, respectively, connected to a sump or reservoir 216. Each pump also preferably has a solenoid-operated unloading relief valve associated therewith, indicated generally at 217 and 218, respectively, which is of standard commercial structure.

Discharge or pressure lines 209 and 210 are connected by means of conduits 220, 221 and 222 and solenoid directional control valves 224, 225 and 226, respectively, with the cylinders 200, 201 and 203, respectively.

The cylinders 200, 201 and 203 are also connected through the said valves 224, 225 and 226, respectively, with the sump 216. The solenoids position the respective valves to advance or retract the cylinders, and, therefore, the respective dies, in accordance with the process described above. Speed control valves 228 and 229, respectively, are preferably disposed in the lines 221 and 222, respectively, upstream of the respective directional control valve. A check valve 231 is preferably located in the pressure line to cylinder 201 so that the pressure of the ram 33 cannot cause or tend to cause the cylinder(s) 201 to react to withdraw the die 34 and 36 laterally during operation of the ram 33 (cylinder 200).

The unloading relief valve 217 permits the low-pressure pump to discharge during actual pulley formation, i.e., while the ram 33 (cylinder 200) is fully loaded and the unloading relief valve 218 permits the high-pressure pump to discharge when the cylinders are at rest and no oil is flowing.

Becausee of the physical location and disposition of the ram 33 (cylinder 200) in the preferred embodiment of the invention, the oil lines to and from cylinder 200 and intermediate the cylinder and the control valve 224 preferably also include a conventional regenerative circuit, indicated generally at 232, and functioning on the down stroke to increase cylinder speed by recycling the hydraulic fluid, in part, without returning it through the sump.

Limit switches 235, 236, 237 and 238 are disposed to be operated by ram 33 in predetermined sequence and time. Limit switches 241 and 242 are disposed to be operated by wedge 83 on its advancing (raising of die 37) and retracting (lowering of die 37) motions, respectively. Limit switch 243 is disposed to be operated by cylinder 201 as die 34 is retracted to free the completed pulley at the end of the cycle.

Switch means is provided to respond when cylinder 201 and, therefore, dies 34 and 36, is in its fully advanced position to signal that a new cycle is commencing. Preferably such switch means comprises a pressure responsive switch 245 disposed in communication with fluid circuit 246 intermediate directional valve 225 and chamber 248 of cylinder 201. Switch 245 responds to a pressure chamber 248 of sufficient magnitude to ensure that the die segments of dies 34 and 36 are fully seated laterally and will remain so during operation of the ram 33 (cylinder 200) during subsequent pulley formation as described above. Of course, during the time of response, valve 225 is in the opposite setting from that shown so as to advance, instead of retract, the piston of cylinder 201.

The limit switches and valves, motors, and the like, are interconnected by suitable electrical circuits including timer, not shown, to operate in the manner described above in connection with FIGS. 5–9, inclusive, and can be modified, of course, to operate in the manner described with respect to the disclosure of FIGS. 10–13, inclusive, and 15–18, inclusive, respectively.

Further, as shown, valve 224 has an intermediate, neutral position which provides a dwell in the travel of ram 33 after contact is made with hub of blank 5 and before pulley formation is commenced during which air is evacuated from the interior of the blank in the manner and for the purpose described above.

While valves 224, 225 and 226 have been described as solenoid-operated and electrically controlled, it is to be understood that other types of valves and control systems, such as, for example, fluid or air, may be used to control the hydraulic circits, including the forming fluid or oil circuits, described below.

Preferably, as indicated above, the forming fluid used in this invention is an oil or similar liquid and, also, preferably the volume and pressure thereof is controlled by a separate hydraulic system from that which actuates and controls the rams and dies.

Figure 20:
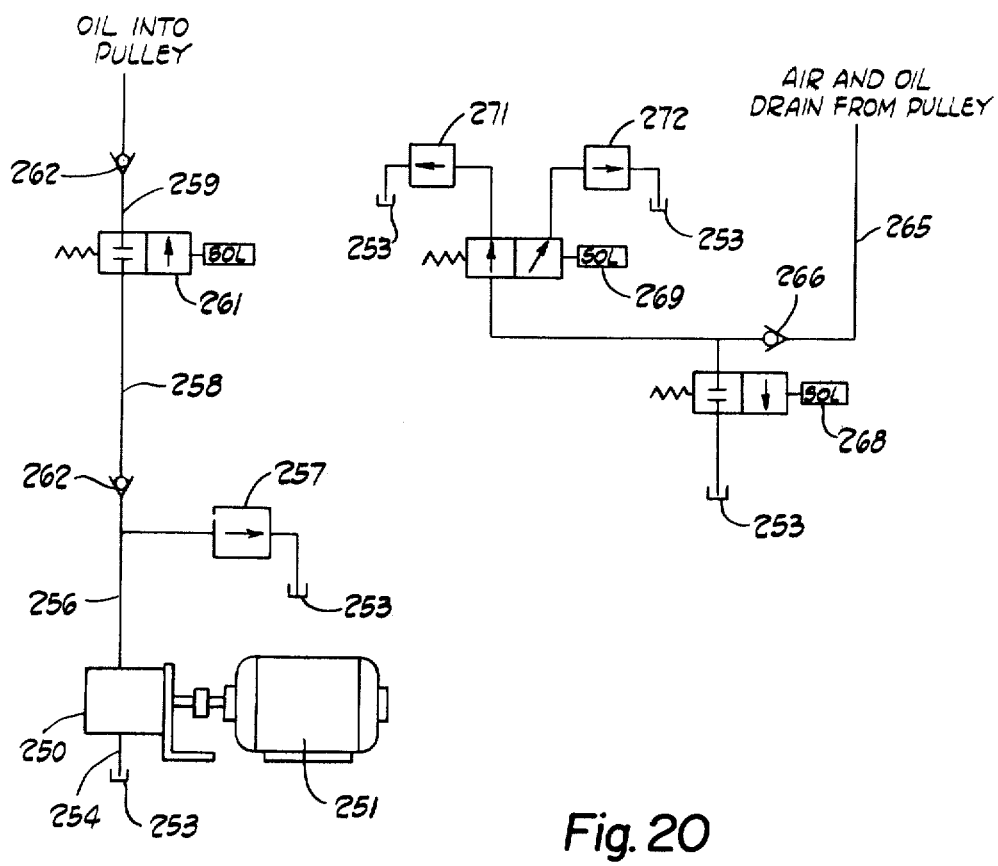
FIG. 20 is a diagrammatic view illustrating the system for controlling the pulley-forming fluid.

A suitable system for providing and controlling the forming fluid is depicted diagrammatically in FIG. 20 wherein like reference characters refer to like parts as in FIGS. 5–9, inclusive. Conveniently and preferably the forming fluid is forced into the spaced within the blank and above and about the inner die 37 by means of a pump 250, operated by an electric motor 251. Pump 250 pumps the fluid from a sump 253 through an intake line 254 and thence out through discharge line 256. The fluid in the discharge line is either recycled through the pressure relief valve 257 into the sump or forced into the space S via the lines 258 and 259 and conduits in ram 37, depending on the position of the solenoid-operated directional valve 261 which is controlled by suitable timer and limit switches in accordance with the teachings of this invention as set forth above. One or more check valves 262 may be disposed in lines 258 and 259 to prevent flow of fluid back into the valve 261 and pump 250.

The forming fluid system also includes means for "draining" the forming fluid from the space S, above inner die 37 and within the blank, and for controlling the pressure of the forming fluid within the said space.

Conveniently, the same lines within the die 37 serve both as intake and discharge lines to and from the space S with suitable valves, not shown, interconnecting either the pump for charging the forming fluid or the valves (and pump, if one is used as suggested above, to evacuate the air) for controlling the discharge therefrom and the pressure of the forming fluid therein.

The discharge system includes a discharge line 265, a check valve 266, a solenoid-operated valve 268 through which large volumes of fluid are discharged to the sump 253 and a second solenoid-operated valve 269 which selectively connects the space S with either a low-pressure relief valve 271 or a high-pressure relief valve 272, both of which also discharge into the sump 253. Valve 268 is operated when the volume of the fluid or oil within the blank is to be reduced quickly and the pressure reduced to zero. Valve 269 is operated to interconnect the low-pressure relief valve 271 in the path between space S and the sump 253 when crimping is being performed and to interconnect the high-pressure relief valve 272 when a bulge is being found or the metal is being forced against the dies to complete formation of a groove(s).

As indicated above, ram 33 is driven downwardly during actual pulley formation so as to exert a large axial force, 75 tons, for example, whereas the forming oil within the blank is at a relative low pressure, sufficient, about 1,500 to 3,000 psi, to prevent internal collapse of the blank (except when crimping when the pressure is at about 200 psi) but also sufficient to force the metal against the dies 34 and 36 as required by the teachings of this invention.

The degree and location of the bulge(s), as well as the force and pressure necessary to initiate formation of the same, is determined by the spacing between the dies, i.e., between 33 and 34, for example.

In each embodiment of this invention described above, means other than the sealing means acting between the fixed die 45 and the flange of the blank may be used to confine the forming fluid within the blank and above the seals 70 on the inner die 37 or its equivalent, provided such means permits the fluid to change in volume and pressure in accordance with the teachings of this invention and further provided that such means does not get caught within a crimped side of a groove or otherwise interfere with the teachings and percepts of this invention or the operation of the apparatus or method as taught herein.

Modifications, changes and improvements to the preferred forms and embodiments of the invention herein depicted and described may occur to those skilled in the art who come to understand the precepts and principles thereof. Accordingly, the patent to be issued hereon should not be limited in its scope to the specific embodiments of the invention herein depicted and described, but by the advance by which the invention has promoted the art.

I claim:

1. A process for making a sheet metal pulley having plural grooves therein in a continuous single work cycle from a hollow generally cup-shaped sheet metal blank having an inner hub portion, an outer axially extending flange portion and at least one axially extending wall portion and at least one angular, transversely extending wall portion therebetween comprising the steps of:
    a. supporting said blank in a metal deforming apparatus;
    b. introducing a forming fluid into the interior of said blank to exert pressure against said wall portions;
    c. exerting an axial force on said blank at said hub portion by actuating a ram member disposed thereat to outwardly deform said wall portions by the coaction of said axial force and said forming fluid;
    d. confining and shaping said outwardly deformed wall portions between plural movable forming die members disposed exteriorly of said blank and cooperatively actuating said ram member and said plural forming die members to partially form grooves;
    e. adjusting the pressure and volume of said forming fluid while simultaneously crimping at least one lateral wall of said grooves to complete the formation thereof; and
    f. withdrawing said plural movable forming die member.

2. The process as defined by claim 1, wherein said blank is supported in said metal deforming apparatus by causing said flange portion to be held between the upper shaped end of a stationary die member and one edge of a shaped first movable forming die member.

3. The process as defined in claim 1, wherein said forming fluid is introduced into the interior of said blank through conduits disposed within a movable forming die member in sealing engagement with the interior of said blank about which said blank is deformed.

4. The process as defined by claim 1, wherein said pulley has two grooves of different pitch diameters.

5. The process as defined by claim 1, wherein said pulley has two grooves of different widths.

6. The process as defined by claim 1, wherein said pulley has two grooves of the same diameter and configuration.

7. The process as defined by claim 1, wherein said blank is comprised of plural axially extending wall portions and angular, transversely extending wall portions and wherein each of said grooves is located and determined as to size by bulging said axially extending wall portions in the blank.

8. The process as defined in claim 1, wherein the pressure of said forming fluid is greater during the deformation of said at least one axially extending wall portion and the formation of an uncrimped groove wall therein than during the formation of a crimped grooved wall therein.

9. The process as defined by claim 1, wherein said grooves are formed sequentially in a continuous single work cycle with the first of said grooves being formed at the end nearest said hub portion of said blank.

10. The process as defined by claim 1, wherein said grooves are formed substantially simultaneously in a continuous single work cycle.

11. The process as defined by claim 1, wherein the pressure and volume of said forming fluid is decreased.

12. The process as defined by claim 1, wherein said pulley is a multi-groove pulley and said grooves are formed sequentially and during the formation of said grooves the pressure and volume of the forming fluid within said blank at the point of deformation is reduced following outward deformation during the crimping of said at least one lateral wall while the pressure exerted by said forming fluid along the remainder of the wall portions of said blank is maintained sufficiently high to promote outward deformation of said wall portions as said axial force is exerted upon said blank.

13. The process as defined by claim 1, wherein said forming fluid is a liquid.

14. The process as defined by claim 1, wherein residual air within said blank is evacuated prior to the exertion of said axial force.

15. The process as defined by claim 1, wherien said pulley is multi-groove and at least one lateral wall of said grooves is crimped thereby providing a pulley having a surface area less than that of said blank.

16. The process as defined by claim 1, wherein an adjacent pair of said plural movable forming die members are biased away from each other.

* * * * *